Patented Dec. 25, 1951

2,579,794

UNITED STATES PATENT OFFICE 2,579,794

TEXTILE DECORATING

Norman S. Cassel, Ridgewood, and Alfred T. Clifford, Fair Lawn, N. J., assignors to Interchemical Corporation, New York, N. Y., a corporation of Ohio No Drawing. Original application June 28, 1946, Serial No. 680,056. Divided and this application June 14, 1950, Serial No. 168,172

15 Claims. (Cl. 260—15)

This invention relates to the pigment-decoration of fabrics. Specifically, the present invention is concerned with the use in the dyeing and printing of textile materials of a pigment dispersion in a homogeneous colloidal solution of a water-soluble hydrophilic colloid in an aqueous medium containing another hydrophilic colloid that has been gelled therein under conditions under which the water-soluble hydrophilic colloid remains in solution.

A full, even color value is a desirable and necessary requisite for a satisfactory textile fabric printed with a pigment printing paste. Good color value can be obtained by the use of an aqueous printing paste containing a water-insoluble pigment and a hydrophilic colloid, the colloidal solution or dispersion of which in water presents a heterogeneous or discontinuous structure. Typical of such hydrophilic colloids is starch, which is widely used for this purpose despite the fact that the resulting pigment print possesses inferior crockfastness and washfastness.

Hydrophilic colloids, the aqueous colloidal solutions of which are homogeneous, have also been used in the preparation of pigment printing pastes. Typical of such hydrophilic colloids are the water-soluble cellulose ethers, gum karaya, gum tragacanth, albumen, sodium alginate, and the like. Pigment prints made from such pastes, however, generally possess relatively poor color value.

(The term "heterogeneous" as used herein means that the colloidal solution or dispersion of a hydrophilic colloid in an aqueous medium possesses discontinuity of structure when it is viewed with an ordinary compound microscope. The term "homogeneous" as used herein means that the colloidal solution or dispersion of a hydrophilic colloid in an aqueous medium is clear and continuous and does not exhibit any structure when it is viewed with an ordinary compound microscope. It should be noted, however, that both types of colloidal solutions or dispersions show some structure when they are viewed with an ultra-microscope.)

We have now discovered that a textile print having an unusually full and even color value can be obtained with a dispersion of a pigment in a homogeneous colloidal solution in an aqueous medium of a water-soluble hydrophilic colloid, with elimination of the disadvantages ordinarily encountered in the use of such a dispersion and without flocculation of the pigment during application of the dispersion to the fabric, by gelling a second hydrophilic colloid in the presence of the water-soluble hydrophilic colloid under conditions under which the latter remains in solution and printing a fabric with the resulting pigmented printing paste. Advantageously, in printing a textile in accordance with our invention, we utilize as the printing paste such a pigmented dispersion in which a water-soluble thermosetting resin is also dissolved so that the resulting printed fabric is rendered wash-fast. Our invention also includes the textile-printing composition and the resulting pigment-printed fabric.

In its simplest form our pigment printing composition comprises essentially a dispersion of a water-insoluble pigment or dyestuff in a homogeneous colloidal solution of a water-soluble hydrophilic colloid in an aqueous medium containing another hydrophilic colloid that has been gelled therein under conditions under which the water-soluble hydrophilic colloid remains in solution. Advantageously, both hydrophilic colloids are initially present as a common homogeneous colloidal solution in such aqueous medium. Preferably, our printing composition comprises such a dispersion of a pigment in which a water-soluble thermosetting resin is also dissolved in the aqueous medium.

Any pigment can be incorporated into the present composition provided it is sufficiently lightfast, does not bleed to any substantial extent in dry-cleaning solvents such as naphtha and carbon tetrachloride, and is sufficiently resistant to soap. Suitable pigments include the phthalocyanines, various metal oxides, carbon black, water-insoluble vat and azo dyestuffs, and the like. The particular pigment selected for a given printing operation will depend not only on its dispersibility and on the required color, of course, but also on the nature of the finished goods.

Similarly, any water-soluble heat-setting resin may be employed in the preparation of the present pigmented printing composition provided that the resulting heat-converted resin is sufficiently resistant to washing and is substantially insoluble in dry-cleaning solvents and provided that no objectionable stiffness is imparted to the printed fabric by the heat-set resin. Moreover, since the heat-set resin appears to serve at least in part as a binder to fix the pigment to the fabric, it must be capable of doing so even when only a small amount thereof is incorporated in the printing composition.

We have obtained especially good results with the use of water-soluble thermosetting urea-aldehyde resins including water-soluble thermosetting urea-formaldehyde resins and water-soluble thermosetting modified urea-formaldehyde resins, particularly water-soluble polyhydric alcohol-modified urea-formaldehyde resins, melamine-aldehyde resins including water-soluble thermosetting melamine-formaldehyde resins and water-soluble thermosetting modified melamine-formaldehyde resins, particularly water-soluble polyhydric alcohol-modified melamine-formaldehyde resins, and mixed urea-melamine-aldehyde resins including water-soluble thermosetting urea-melamine-formaldehyde resins and water-soluble thermosetting modified urea-melamine-formaldehyde resins, particularly water-soluble polyhydric alcohol-modified urea-melamine-formaldehyde resins. Other water-soluble heat-setting resins, meeting the above requirements, such as water-soluble thermosetting phenol-formaldehyde resins and polyvinyl alcohol-aldehyde resins may also be used, however. As with the pigment, the choice of the particular water-soluble heat-setting resin employed will be governed to a large extent by the nature of the finished fabric. Moreover, in some cases the reactants from which the water-soluble resins are derived may themselves be incorporated in the composition and the resin subsequently formed therefrom.

The two hydrophilic colloids forming the basis of the present composition must be initially soluble in the aqueous medium thereof to give a common homogeneous colloidal solution, and at least one of them must be water-soluble. Such a homogeneous solution of a hydrophilic colloid can be converted to a heterogeneous dispersion by suitable modification of the initial solution so that the hydrophilic colloid is coagulated or gelled or thrown out of solution as a gelatinous precipitate. Accordingly, it is a feature of our invention that the two hydrophilic colloids are so selected that one of them can be gelled by modification of the initial common homogeneous colloidal solution, under conditions under which the other remains in solution, to introduce a heterogeneous structure or discontinuity into such solution. It is this convertibility characteristic of such a hydrophilic colloid that is utilized in obtaining the unusual results of our invention.

The discontinuity or heterogeneous structure imparted to the common homogeneous solution by gelation of one of the two hydrophilic colloids therein appears to be the reason for the improved and unusual color value obtained with such a pigmented printing composition. The resulting print not only possesses a full and even color but does not evidence any flocculation of the pigment. In contrast, a print made from a pigmented homogeneous solution of either hydrophilic colloid alone or from the pigmented unmodified common homogeneous solution possesses a relatively poor color value.

Increased color value is obtained with the present printing composition not only when the decorated fabric is dried at elevated temperatures but also when it is dried at room temperatures, at which the improvement is more apparent. Our printing paste, with its discontinuous structure, produces prints that are equally brilliant and full whether the printed fabric is dried in the air or in a heated oven. This characteristic is especially important in those processes, e. g., screen or stencil printing, in which it is customary to air-dry the colored fabric. A pigmented homogeneous solution of a hydrophilic colloid alone or the pigmented unmodified common homogeneous solution of the two hydrophilic colloids, on the other hand, gives prints that are fairly satisfactory when they are dried in an oven or on steam cans but flat and lacking in brightness when they are dried at room temperatures.

Substantially any two hydrophilic colloids that form homogeneous colloidal solutions in an aqueous medium can be employed in the present composition. The combination of hydrophilic colloids must be so selected, however, that both are initially compatibly soluble in a common aqueous medium and that one of them can be coagulated or gelled from such common solution under conditions under which the other of them remains in solution. In addition, of course, the hydrophilic colloids should be compatible with the remainder of the ingredients of the final dispersion.

The manner in which gelation of one of the hydrophilic colloids is effected depends largely on the nature of the two hydrophilic colloids selected and the character of the initial common solution thereof. Either chemical or physical means may be employed to effect such gelation. Typical methods of introducing a discontinuous structure into the initial common homogeneous colloidal solution comprise adjustment of the alkalinity or acidity of the initial solution, addition of a water-soluble salt thereto, addition of a water-miscible organic liquid to the initial solution, and the like. The following combinations of two hydrophilic colloids are representative of those falling within the scope of our invention:

I. An alkaline solution of an alkali-soluble, water-insoluble alkyd cellulose ether such as alkali-soluble, water-insoluble hydroxyethyl cellulose, alkali-soluble, water-insoluble methyl or ethyl cellulose, or alkali-soluble, water-insoluble sodium carboxymethyl cellulose, is intimately mixed with a water solution of an alkali-soluble, water-soluble hydrophilic colloid such as alkali- and water-soluble methyl or ethyl cellulose, alkali- and water-soluble hydroxyethyl cellulose, alkali- and water-soluble sodium carboxymethyl cellulose, sodium alginate, or a vegetable gum in proportions to provide a common homogeneous colloidal solution thereof. This common solution is substantially neutralized by the addition of acid with agitation whereupon the alkali-soluble, water-insoluble material is caused to gel with the formation of a smooth paste having a heterogeneous structure when it is viewed with an ordinary compound microscope (magnification about 50 times).

II. A water solution of a water-soluble carboxyalkyl cellulose ether such as water-soluble sodium carboxymethyl cellulose is intimately mixed with a water solution of a water-soluble hydrophilic colloid such as water-soluble methyl cellulose, water-soluble hydroxyethyl cellulose or a vegetable gum that is not coagulated or gelled by a salt containing a polyvalent metal, in proportions to provide a common homogeneous colloidal solution thereof. Upon the addition of a salt containing a polyvalent metal such as aluminum acetate or sodium aluminate to this common solution, the water-soluble carboxyalkyl cellulose ether is thrown out of solution with the formation of a smooth mixture having a heterogeneous structure.

III. A water solution of sodium alginate is intimately mixed with a water solution of a water-soluble hydrophilic colloid such as water-soluble methyl cellulose, water-soluble hydroxyethyl cellulose or a vegetable gum that is not coagulated or gelled by polyvalent cations in proportions to provide a common homogeneous solution thereof. Upon the addition of a salt of a polyvalent metal such as calcium chloride, the sodium alginate is thrown out of solution with the formation of a smooth mixture having a heterogeneous structure.

IV. A water solution of a water-soluble hydrophilic colloid such as water-soluble hydroxyethyl cellulose or water-soluble sodium carboxymethyl cellulose that can be gelled by the addition of a water-miscible alcohol aldehyde or ketone is intimately mixed with a water solution of a water-soluble hydrophilic colloid such as water-soluble methyl or ethyl cellulose that is not gelled by the addition of a water-miscible alcohol, aldehyde or ketone in proportions to provide a common homogeneous colloidal solution thereof. Upon the addition of a water-miscible alcohol, aldehyde or ketone, the former material is thrown out of solution in such a manner as to produce a smooth mixture with a heterogeneous structure.

Each of these combinations of two hydrophilic colloids, when modified as indicated and the resulting heterogeneous mixture suitably pigmented, produces a print of improved color value over that obtained when either hydrophilic colloid is used alone or when the common homogeneous solution of both hydrophilic colloids is used. We have obtained unusually good results, however, with the use of a pigmented homogeneous colloidal solution of an alkali-soluble, water-soluble alkyl cellulose, particularly alkali- and water-soluble methyl cellulose, in water in which an alkali-soluble, water-insoluble hydroxyalkyl cellulose, particularly alkali-soluble, water-insoluble hydroxyethyl cellulose, has been gelled by neutralization of the initial common homogeneous colloidal alkaline solution of both cellulose ethers. Advantageously, we employ a low-viscosity type of methyl cellulose and a hydroxyethyl cellulose that is prepared so as to be soluble in a relatively low concentration of alkali. We have also obtained especially good results with the use of a pigmented homogeneous colloidal solution of an alkali-soluble, water-soluble hydroxyalkyl cellulose, particularly alkali- and water-soluble hydroxyethyl cellulose, in water in which an alkali-soluble, water-insoluble hydroxyalkyl cellulose, particularly alkali-soluble, water-insoluble hydroxyethyl cellulose, has been gelled by neutralization of the initial common homogeneous colloidal alkaline solution of both cellulose ethers. In addition to a very marked improvement in color value, prints prepared from such pigmented dispersions, in which a water-soluble thermosetting resin has also been incorporated, possess an unusual degree of resistance to crocking and washing.

Another important feature of the present invention is that the rheological properties, notably the viscosity and the yield value, of the resulting printing paste can be readily controlled so as to impart improved printing qualities thereto. The effects of this control of the rheological properties of our textile-decorating composition can be observed in the increased color value and the sounder coverage obtained and in the almost complete elimination of flocculation and migration of the pigment upon application of the composition to a fabric and upon drying of the decorated fabric.

The following example is illustrative of this control of rheological properties possible with our invention: In the use of a low-viscosity type of a water-soluble cellulose ether such as methyl cellulose, a concentration of 12 to 15% is necessary to provide a printing paste having a satisfactory printing viscosity. If the concentration of the cellulose ether is reduced by the use of a high-viscosity type in order to lower the cost of the composition, for example, then, although the printing paste may have the proper printing viscosity, the resulting print has little color value for practical purposes. If, however, a common homogeneous colloidal solution is prepared by mixing a water solution of such a low-viscosity type of an alkali- and water-soluble cellulose ether with an alkaline solution of an alkali-soluble, water-insoluble cellulose ether, such as hydroxyethyl cellulose, and the alkali-soluble, water-insoluble cellulose ether is gelled by neutralization of the common alkaline solution, then a printing paste having the necessary printing viscosity can be prepared with a total concentration of cellulosic material ranging from 1 to 6%. The resulting composition gives prints of excellent color value and, when it is compounded with a water-soluble thermosetting resin, produces prints having unusually good fastness to crocking and washing.

If the alkali-soluble, water-insoluble cellulose ether is gelled from its alkaline solution alone, a lumpy stringy gel of little use in the preparation of textile-decorating compositions is formed. When, however, the alkali-soluble, water-insoluble cellulose ether is gelled from a common alkaline solution with an alkali- and water-soluble cellulose ether, the entire solution is evenly thickened, and a smooth paste of exceptional usefulness is obtained. Moreover, the resulting paste is shorter and less tacky and thus possesses improved printing qualities.

The description of our invention has been based so far principally on its application in the printing of textiles and other fabrics since our composition possesses so many advantages in this field. The use of our invention is equally applicable in the dyeing of fabrics, and a definite control and substantial elimination of the migration of the pigment during drying of the pigment-dyed fabric are accomplished with the present procedure. By no means is our invention to be limited to either field although it is possible that, under a given set of conditions, it may have a greater application in one field than in the other.

In the preparation of the present composition, separate aqueous solutions of the two selected hydrophilic colloids one of which must be water-soluble, of the water-soluble thermosetting resin, and of the water-soluble salt, if such a coagulating or gelling medium is to be used, are advantageously preliminarily prepared. The pigment can be prepared in paste form by mixing a precipitate of the pigment, e. g., a press cake thereof, and a suitable dispersing agent with sufficient water to form a paste of the desired consistency and then grinding the mixture until the pigment is in a finely divided condition; or the pigment can be otherwise prepared in a readily dispersible form. The solutions of the two hydrophilic colloids are mixed to form a common homogeneous colloidal solution thereof; and one of the two hydrophilic colloids is then gelled, to provide the desired discontinuous structure, in any appropriate manner as by neutralization or by addition of a salt solution or of a water-miscible organic liquid as the case may be. Agitation of the initial common solution during gelation of one of the hydrophilic colloids is helpful in providing a smooth paste of uniform consistency. The resin solution and the pigment dispersion are then added in turn to the resulting paste, to which water can be added to provide a decorating composition having the desired dyeing or printing consistency. A resinification catalyst, such as a suitable acidic substance, may be incorporated, advantageously in the form of an aqueous solution, in the composition if desired. The several ingredients may, however, be otherwise admixed, care being taken that the pigment is properly dispersed in the final composition.

Where the present composition is to be utilized in the printing of a fabric, it can be applied in any convenient manner as from an intaglio cylinder, with the use of a screen or a stencil, or the like. Where the composition is employed in the dyeing of a fabric, it can be applied by means of a pad-dyeing operation; or it can be deposited on the fabric in the form of a thin film by transfer from a roll-coating machine. The decorated fabric can be dried at either elevated or normal atmospheric temperatures, whichever may be applicable to a given decorating procedure. Regardless of whether a fabric decorated with the present composition is passed through a drying oven or over a drying can or is allowed to dry in the air, a clear, full, even color is obtained; and no flocculation or migration of the pigment is evident.

The concentration of each hydrophilic colloid contained in our pigmented composition should, of course, be sufficient to permit the formation of the desired discontinuous structure in the initial common homogeneous colloidal solution thereof and to provide the necessary viscosity in the resulting paste. Where the hydrophilic colloid is obtainable in several forms of varying viscosity, as is the case with the cellulose ethers, then the viscosity type of the particular cellulose ether should also be taken into consideration, for the concentration of cellulose ether is dependent thereon.

In the case of the alkyl celluloses, each of which is obtainable in a wide range of viscosities, this viscosity factor is important in another respect, namely, the color value of the resulting decorated fabric. The higher viscosity types of alkyl celluloses, such as methyl cellulose, appear to produce a finished fabric having a somewhat less color value than do the lower viscosity types. For example, we have found that, with methyl cellulose, the low viscosity types (15 and 25 centipoises) and the medium viscosity types (100 and 400 centipoises) can be more advantageously employed than the high viscosity types (1500 and 4000 centipoises). (These viscosity types represent those presently commercially available and sold under the trade name "Methocel." The viscosity of each type is the average viscosity of a 2% aqueous solution thereof at 20° C.). With respect to the hydroxyalkyl and the carboxyalkyl celluloses, however, this viscosity factor does not appear to have this effect; for substantially equivalent results are obtained whether a low-viscosity or a high-viscosity type is used.

The concentration range of the water-soluble thermosetting resin depends not only on the particular resin employed and on the type of fabric being decorated but also on a number of other factors. In general, the lower limit of concentration depends on the desired or required washfastness of the finished fabric. The upper limit of concentration depends primarily on the maximum stiffness permissible in the finished fabric. Generally, the preferred range of resin concentrate is on the order of 1 to 10% by weight, the particular concentration employed depending largely on the nature of the particular application.

Various types of fabrics can be decorated by means of the present process and the application of our invention is not limited to any particular fabric. Excellent color value without migration and flocculation of the pigment are obtained equally well whether the fabric being decorated is composed of natural fibers such as cotton, flax, wool, and hair fibers, of synthetic fibers such as regenerated cellulose, cellulose acetate, polyamide, protein polymer, vinyl polymer, and the like fibers, of inorganic fibers such as glass, mineral, or metal fibers, or of mixtures of such fibers. Furthermore, the application of our process is not limited to the usual types of woven or knitted fabrics but may also be used to decorate pile fabrics, paper, or fabrics made by processes such as combing, matting, or felting, e. g., a fabric composed of loosely meshed cotton fibers bonded together by the localized application of a resin. The present process, moreover, is equally applicable whether a light or a heavy fabric is being decorated. (The term "fabric" as used in the claims includes all these various types of materials as well as yarns, to the decorating of which our process is also applicable.)

The following examples are typical illustrations of the application of our invention (parts by weight in all examples):

EXAMPLE I

A. *Clear containing 5% cellulosic derivatives and 1% thermosetting resin*

This clear, when properly pigmented, produces pigment prints which show excellent color value and, when properly cured, possess outstanding fastness to crocking and washing. An important characteristic of this pigmented clear is its ability to give prints of undiminished color value upon air-drying, a feature that is especially important in the preparation of screen prints, an operation in which it is customary to air-dry the prints before curing.

This clear is preparing by first mixing the following:

| | |
|---|---:|
| 10% solution of alkali-soluble, water insoluble hydroxyethyl cellulose in 4% aqueous sodium hydroxide | 20.0 |
| 10% aqueous solution of 25 cps. alkali- and water-soluble methyl cellulose | 30.0 |
| Water | 36.0 |

The resulting solution is neutralized by the addition of:

| | |
|---|---:|
| 10% orthophosphoric acid ____(approx.)__ | 8.0 |

To the neutral mixture are added:

| | |
|---|---:|
| 50% aqueous solution of water-soluble polyhydric alcohol-modified melamine-formaldehyde resin | 2.0 |

The weight is adjusted to 100 by mixing in:

| | |
|---|---:|
| Water _____(approx.)__ | 4.0 |
| | 100.0 |

B. *Print colors containing up to 3 or 4% pigment*

These colors are prepared by mixing Clear A with the proper amounts of water-extendible dispersions of each of the following pigments: carbon black, copper phthalocyanine green, and a vat yellow (Color Index Prototype Number 105). 3 parts of a 5% aqueous solution of diammonium phosphate are added to 100 parts of each of the print colors.

C. *Three-color screen prints on mercerized cotton table-cloth*

The three colors described in B are each applied to mercerized cotton table-cloth fabric by the use of screen stencils of the type customarily used for making screen prints. The printed fabric is allowed to dry in the air, and the resin is finally cured by heating the dried fabric in a curing oven at 300° F. for 2 minutes. The resulting printed fabric has exceptionally good color value and possesses excellent resistance to washing and crocking.

EXAMPLE 2

A clear is prepared as in Example 1A, except that the thermosetting resin is omitted, and three print colors are compounded from this clear as in Example 1B. These three colors are applied to a cotton fabric by the use of screen stencils, and the printed fabric is air-dried as in Example 1C. Good color value is obtained in the resulting finished fabric, which, although resistant to dry-crocking, is not particularly fast to wet-crocking or to washing.

EXAMPLE 3

A. *Clear containing 10% cellulosic derivatives and 2% thermosetting resin for use in printing deep shades*

The following ingredients are first thoroughly mixed:

10% solution of alkali-soluble, water-insoluble hydroxyethyl cellulose in 4% aqueous sodium hydroxide _____ 20.0
12.5% aqueous solution of 25 cps. alkali- and water-soluble methyl cellulose _____ 64.0

The resulting solution is neutralized by the addition of:

10% orthophosphoric acid _____(approx.) __ 8.0

To the neutral mixture are added:

50% aqueous solution of water-soluble, polyhydric alcohol-modified melamine-formaldehyde resin _____ 4.0

The weight is adjusted to 100 by mixing in:
Water _____(approx.) __ 4.0
                              ———
                              100.0

B. *Print colors containing up to 5% pigment*

These colors are prepared by mixing Clear A with the proper amounts of water-extendible dispersions of each of the following pigments: metallized alpha-nitroso-beta-naphthol iron oxide yellow, and an azo violet (prepared by coupling 5-nitroso-2-amino anisole with 2,3-oxynaphthoic-alpha-naphthalide). 3 parts of a 5% aqueous solution of diammonium phosphate are added to 100 parts of each of the print colors.

C. *Three-color roll prints on drapery fabric*

The three colors described in B are each applied to a drapery fabric using engraved print rolls. The printed fabric is dried on steam cans or in an oven. Finally, the resin is cured by heating the dried fabric in a curing oven for 2 minutes at 350° F. The resulting printed fabric has good color value, lightfastness and washfastness and, even though the shades are deep, excellent resistance to crocking.

EXAMPLE 4

A. *Clear containing 4% cellulosic derivatives and 2% thermosetting resin*

This clear is prepared by first mixing:

10% solution of alkali-soluble water-insoluble hydroxyethyl cellulose in 4% aqueous sodium hydroxide _____ 15.0
10% aqueous solution of alkali- and water-soluble hydroxyethyl cellulose _____ 25.0
Water _____ 46.0

The resulting solution is neutralized by the addition of:

10% orthophosphoric acid _____(approx.) __ 6.0

To the neutral mixture are added:

50% aqueous solution of water-soluble polyhydric alcohol-modified urea-formaldehyde resin _____ 4.0

The weight is adjusted to 100 by mixing in:

Water _____(approx.) __ 4.0
                              ———
                              100.0

B. *Print colors*

Three colors are prepared as in Example 1B except that Clear 4A is used instead of Clear 1A.

C. *Prints*

Prints may be made as in Example 1C and similarly possess good color value and exhibit excellent resistance to crocking and washing. Moreover, prints made with the present colors show some fastness even when air-dried or when dried and cured at relatively low temperatures (212–250° F.).

EXAMPLE 5

A. *Clear containing 2% cellulosic derivatives and 1% thermosetting resin for use in preparing prints in medium and light shades*

The following are first mixed:

10% solution of alkali-soluble, water-insoluble hydroxyethyl cellulose in 4% aqueous sodium hydroxide _____ 10.0
3% aqueous solution of alkali- and water-soluble hydroxyethyl cellulose _____ 33.3
Water _____ 44.7

The resulting solution is neutralized by the addition of:

10% orthophosphoric acid ____(approx.) __ 4.0

To the neutral mixture are added:

50% aqueous solution of water-soluble polyhydric alcohol-modified urea-formaldehyde resin _____ 2.0

The weight is adjusted to 100 by mixing in:

Water _____(approx.) __ 6.0
                              ———
                              100.0

B. Print color

A print color is prepared by mixing Clear A with a water-extendible dispersion of a pigment, for example, iron oxide red, in such proportions as to give, for example, 0.25% pigment.

C. Single-color blotch print on cotton sheeting

The color described in B is applied to a fabric, e. g., cotton sheeting, with a blotch-print roll. The printed fabric is dried by passage over steam cans, and the resin is finally cured by heating the dried fabric 2 minutes at 350° F. An evenly colored fabric showing excellent color value and good resistance to crocking and washing is obtained.

EXAMPLE 6

A. Clear containing 5% cellulosic derivatives and 2% thermosetting resin for printing medium and light shades This clear is prepared by first mixing:

| | |
|---|---|
| 3% aqueous solution of water-soluble sodium carboxymethyl cellulose | 20.0 |
| 10% aqueous solution of 15 cps. water-soluble methyl cellulose | 44.0 |
| Water | 26.0 |

To the resulting solution are added:

| | |
|---|---|
| 10% sodium aluminate | 2.0 |

The mixture is neutralized by the addition of:

| | |
|---|---|
| 10% orthophosphoric acid _____(approx.) | 1.0 |

To the neutral paste are added:

| | |
|---|---|
| 50% aqueous solution of water-soluble polyhydric alcohol-modified melamine-formaldehyde resin | 4.0 |

The weight is adjusted to 100 by the addition of:

| | |
|---|---|
| Water _____(approx.) | 3.0 |
| | 100.0 |

B. Print colors

Three colors are prepared as in Example 1B except that Clear 6A is used instead of Clear 1A.

C. Prints

A print is made as described in Example 1C. The finished fabric has a full, even color and excellent crock- and washfastness.

EXAMPLE 7

A. Clear prepared from methyl cellulose, sodium alginate, and urea-formaldehyde resin, suitable for printing medium and light shades The following three ingredients are first mixed:

| | |
|---|---|
| 3% aqueous solution of sodium alginate | 10.0 |
| 10% aqueous solution of 25 cps. water-soluble methyl cellulose | 40.0 |
| Water | 42.0 |

To the resulting solution are added:

| | |
|---|---|
| 5% aqueous solution of calcium chloride | 6.0 |

To the resulting paste are added:

| | |
|---|---|
| 50% aqueous solution of water-soluble polyhydric alcohol-modified urea-formaldehyde resin | 2.0 |
| | 100.0 |

B. Print colors

Colors are prepared as in Example 1B except that Clear 7A is used instead of Clear 1A.

C. Prints

A print is made as described in Example 1C, and the finished fabric again possesses good color and a high degree of resistance to crocking and washing.

EXAMPLE 8

A. Clear for printing medium and light shades

The following are mixed in the order indicated:

| | |
|---|---|
| 3% aqueous solution of water-soluble sodium carboxymethyl cellulose | 60.0 |
| 10% aqueous solution of 25 cps. water-soluble methyl cellulose | 12.0 |
| Isopropyl alcohol | 24.0 |
| 50% aqueous solution of water-soluble polyhydric alcohol-modified melamine formaldehyde resin | 4.0 |
| | 100.0 |

B. Print colors

Print colors containing up to about 3% pigment are prepared by mixing Clear A with water-extendible dispersions of each of the following pigments: copper phthalocyanine green iron oxide red, and carbon black. About 3 parts of 5% diammonium phosphate to 100 parts of each print color are added.

C. Three-color print on spun-rayon scarf fabric

The three colors described in B are printed with silk screen stencils on a spun-rayon scarf fabric. The printed fabric is allowed to air-dry, and the resin is cured by heating the dried fabric to 300° F. for 3 minutes. The resulting printed fabric has excellent color value and shows good fastness to the usual cleaning procedures and to crocking.

EXAMPLE 9

A. Clear containing 5% cellulosic derivatives and 12.5% thermosetting resin for pad-dyeing medium to heavy shades The following are mixed:

| | |
|---|---|
| 10% solution of alkali-soluble, water-insoluble hydroxyethyl cellulose in 4% aqueous sodium hydroxide | 20.0 |
| 10% aqueous solution of 15 cps. alkali- and water-soluble methyl cellulose | 30.0 |
| Water | 15.0 |

The resulting solution is neutralized by the addition of:

| | |
|---|---|
| 10% orthophosphoric acid____(approx.) | 8.0 |

To the neutral mixture are added:

| | |
|---|---|
| 50% aqueous solution of water-soluble polyhydric alcohol-modified melamine-formaldehyde resin | 25.0 |

The weight is adjusted to 100 by mixing in:

| | |
|---|---|
| Water_____(approx.) | 2.0 |
| | 100.0 |

B. Padding liquor

A padding liquor containing 0.5% by weight of a vat blue is prepared with the following ingredients, which are mixed in the order indicated:

| | |
|---|---|
| Clear A | 10.0 |
| Water | 80.0 |
| 5% aqueous solution of diammonium hydrogen phosphate | 5.0 |
| Water-extendible dispersion of Indanthrene Blue GCDS (Color Index No. 113) containing 10% pigment | 5.0 |
| | 100.0 |

C. Pad-dyeing

This padding liquor is applied to a fabric, for example, spun-rayon dress goods, by means of a three-roll padder. The wet dyed fabric is dried by passage over steam cans. Finally, the resin is cured by subjecting the dried fabric to a temperature of 350° F. for 2 minutes in a curing oven. The finished fabric shows full color value, and there is no evidence of migration or flocculation of the pigment.

This application is a divisional application of application Serial No. 680,056, filed June 28, 1946, now Patent 2,527,530.

We claim:

1. A fabric-decorating composition comprising a water-insoluble pigment dispersed in a vehicle comprising a heterogeneously gelatinized water-soluble sodium alginate dispersed in an aqueous colloidal solution of a non-gelatinized water-soluble cellulose ether, said colloidal solution having dissolved therein a polyvalent metal salt as a gelatinizing agent for the gelatinized sodium alginate.

2. A fabric-decorating composition as claimed in claim 1, wherein the non-gelatinized water-soluble cellulose ether is water-soluble hydroxyethyl cellulose.

3. A fabric-decorating composition as claimed in claim 1, wherein a water-soluble thermosetting resin is dissolved in the aqueous solution.

4. A vehicle for use in a fabric decorating composition comprising a heterogeneously gelatinized sodium alginate dispersed in an aqueous colloidal solution of a non-gelatinized water-soluble cellulose ether, said colloidal solution having dissolved therein a polyvalent metal salt as a gelatinizing agent for the gelatinized sodium alginate.

5. A vehicle as claimed in claim 4, wherein the non-gelatinized water-soluble cellulose ether is water-soluble hydroxyethyl cellulose.

6. A vehicle as claimed in claim 4, wherein a water-soluble thermosetting resin is dissolved in the aqueous solution.

7. The method of decorating a fabric to obtain a full even color value thereon, which comprises applying to the fabric a water-insoluble pigment dispersed in a vehicle comprising a heterogeneously gelatinized sodium alginate dispersed in an aqueous colloidal solution of a non-gelatinized water-soluble cellulose ether, said colloidal solution having dissolved therein a polyvalent metal salt as a gelatinizing agent for the gelatinized sodium alginate.

8. The method as claimed in claim 7, wherein the non-gelatinized water-soluble cellulose ether is water-soluble hydroxyethyl cellulose.

9. The method as claimed in claim 7, wherein a water-soluble thermosetting resin is dissolved in the aqueous solution.

10. The method of preparing a fabric-decorating composition comprising forming a common homogeneous aqueous colloidal solution of sodium alginate and of a water-soluble cellulose ether, adding a polyvalent metal salt as a gelatinizing agent will heterogeneously gelatinize the sodium alginate to yield a dispersion of heterogeneously gelatinized sodium alginate dispersed in an aqueous colloidal solution of non-gelatinized water-soluble cellulose ether, and then dispersing a water-insoluble pigment in the dispersion.

11. The method as claimed in claim 10, in which the non-gelatinized water-soluble cellulose ether is water-soluble hydroxyethyl cellulose.

12. The method as claimed in claim 10, in which a water-soluble thermosetting resin is dissolved in the aqueous solution.

13. The method of controlling the rheological properties of a heterogeneous gelatinous dispersion of sodium alginate in an aqueous colloidal solution of a non-gelatinized water-soluble cellulose ether, which comprises forming a common homogeneous aqueous colloidal solution of sodium alginate and of a water-soluble cellulose ether, adding a polyvalent metal salt as a gelatinizing agent which will heterogeneously gelatinize the sodium alginate to yield a dispersion of heterogeneously gelatinized sodium alginate dispersed in an aqueous colloidal solution of non-gelatinized water-soluble cellulose ether, and then dispersing a water-insoluble pigment in the dispersion.

14. The method as claimed in claim 13, in which the non-gelatinized water-soluble cellulose ether is water-soluble hydroxyethyl cellulose.

15. The method as claimed in claim 13, which includes the step of dissolving a water-soluble thermosetting resin in the aqueous solution.

NORMAN S. CASSEL.
ALFRED T. CLIFFORD.

REFERENCES CITED

The following references are of record in the file of this patent:

UNITED STATES PATENTS

| Number | Name | Date |
|---|---|---|
| 2,245,499 | Reichel | June 10, 1941 |